United States Patent [19]

Mori et al.

[11] Patent Number: 4,910,113

[45] Date of Patent: Mar. 20, 1990

[54] COLORED MICROFINE GLOBULAR PARTICLES, METHOD FOR PRODUCTION THEREOF AND USES THEREOF

[75] Inventors: Yoshikuni Mori, Settsu; Mitsuo Kushino, Minoo; Hayato Ikeda, Settsu; Nobuaki Urashima, Takatsuki; Kenji Minami, Suita; Iwao Fujikawa, Otsu, all of Japan

[73] Assignee: Nippon Shokubai Kagaku Kogyo Kabushiki Kaisha, Osaka, Japan

[21] Appl. No.: 237,772

[22] PCT Filed: Nov. 10, 1987

[86] PCT No.: PCT/JP87/00867

§ 371 Date: Jul. 7, 1988

§ 102(e) Date: Jul. 7, 1988

[87] PCT Pub. No.: WO88/03545

PCT Pub. Date: May 19, 1988

[30] Foreign Application Priority Data

Nov. 10, 1986 [JP] Japan .................. 61-265695
Jun. 5, 1987 [JP] Japan .................. 62-139664

[51] Int. Cl.$^4$ .................. G03G 9/08; B32B 5/16; B01J 13/02
[52] U.S. Cl. .................. 430/106; 430/137; 430/138; 428/407; 428/402.24; 264/4.1
[58] Field of Search .......... 428/407, 402.24; 430/106, 137, 138; 264/4.1

[56] References Cited

U.S. PATENT DOCUMENTS

| | | | |
|---|---|---|---|
| 3,544,507 | 12/1970 | Lloyd | 428/407 |
| 3,883,440 | 5/1975 | Tamai et al. | 430/114 |
| 3,959,153 | 1/1976 | Sadamatsu et al. | |
| 4,506,002 | 3/1985 | Takaki et al. | 430/220 |
| 4,797,340 | 1/1989 | Tanaka et al. | 430/109 |

FOREIGN PATENT DOCUMENTS

| | | | |
|---|---|---|---|
| 3102823 | 3/1977 | Fed. Rep. of Germany . | |
| 59221306 | 6/1969 | Japan˙ . | |
| 59221305 | 8/1973 | Japan . | |
| 4743750 | 11/1977 | Japan . | |
| 59221304 | 11/1978 | Japan . | |
| 3610231 | 3/1979 | Japan . | |
| 4310799 | 4/1980 | Japan . | |
| 5756507 | 7/1980 | Japan . | |
| 56106250 | 7/1981 | Japan . | |
| 58-100855 | 6/1983 | Japan | 430/138 |
| 1583564 | 9/1967 | United Kingdom . | |
| 1583411 | 12/1981 | United Kingdom . | |

*Primary Examiner*—Paul R. Michl
*Assistant Examiner*—Jeffery A. Lindeman
*Attorney, Agent, or Firm*—Burns, Doane, Swecker & Mathis

[57] ABSTRACT

Colored microfine globular particles are produced by causing carbon black to react with a polymer capable of reacting with the carbon black thereby forming a carbon black-graft polymer, dispersing this carbon black-graft polymer in a polymerizable monomer component, and then polymerizing the polymerizable monomer component. These particles, in the unmodified form, are usable as a toner for the development of images of static charge and, in a form incorporated in a varying component, are usable such as in resin composition, coating composition, thermosensitive transfer ink ribbon coating agent, thermosensitive transfer ink, or back-coating agent for magnetic recording medium.

45 Claims, No Drawings

COLORED MICROFINE GLOBULAR PARTICLES, METHOD FOR PRODUCTION THEREOF AND USES THEREOF

BACKGROUND OF THE INVENTION

1. Technical Field

This invention relates to colored microfine globular particles, a method for the production thereof, and uses thereof. More particularly, it relates to colored microfine globular particles which have carbon black uniformly dispersed therein and are usable as a toner for the development of images of electro static charge, as a filler for thermoplastic resin compositions and coating compositions, as a coating agent for thermosensitive transfer ink ribbons, as a coloring agent for thermosensitive transfer ink ribbons, as a coloring agent for thermosensitive transfer ink, thermosetting resin compositions, and backcoats in magnetic recording media, and as a charge control agent, a method for the production of the colored microfine globular particles, and uses of the colored microfine globular particles.

2. Background Art

The electrophotography is a process of producing an image by forming an electric latent image on a photosensitive element formed with a photoconductive material such as selenium, zinc oxide, or cadmium sulfide, developing the latent image with a developing powder, transferring the image of the developing powder as onto a sheet of paper, and fixing the transferred image on the paper.

Heretofore, the toner used for the development of images of electro static charge has been generally produced by melting and mixing for thorough dispersion a coloring agent and other additives (such as a charge control agent, an offset preventing agent, and a lubricant) in a thermoplastic resin, then finely crushing the resultant solid mixture, classifying the produced particles, and selecting those of desired particle diameters as colored microfine particles.

The method which produces the toner by the aforementioned crushing, however, possesses various drawbacks of its own. Firstly, it involves many steps of operation such as the step of producing a resin, the step of mixing the resin with a coloring agent and other additives, the step of crushing the resultant solid mixture, and the step of classifying the particles resulting from the crushing and obtaining particles of desired diameters as colored microfine particles and, necessitates use of various devices adapted to perform these steps. The toner produced by this method is very expensive as an inevitable consequence. Particularly for the purpose of obtaining a toner the particles of which have diameters falling in the range optimum for the production of an image clear and sparingly liable to fog, the step of classifying the particles constitutes itself an essential requirement. It is, however, difficult to obtain perfect removal of extremely fine particles and coarse particles by-produced during the step of crushing. Moreover, the by-produced rejectable particles raise a problem from the standpoint of yield. Secondly, it is extremely difficult to obtain uniform dispersion of the coloring agent and other additives in the resin during the step of mixing. Thirdly, since the particles of the toner produced by this method have no fixed shape and consequently possess no uniform triboelectric property, no uniform charging property is exhibited between the adjacent particles and, as the result, the resolution of the image obtained with the toner is inferior. Further, owing to the lack of uniform shape, the particles of the toner exhibit poor flowability and the extremely fine fragments produced when the particles are crushed during the course of triboelectrification induce the phenomenon of fogging of the developed image. Thus, the method under discussion is problematic in numerous ways.

For the purpose of eliminating the various drawbacks suffered by the toner produced by the crushing method, various methods have been proposed for the production of the toner by the emulsion polymerization or suspension polymerization technique (Japanese Patent Publication SHO 36(1961)-10,231, Japanese Patent Publication SHO 43(1968)-10,799, U.S. Pat. No. 3,959,153, and U.S. Pat. No. 3,634,251). These methods are meant to provide speedy synthesis of a toner containing carbon black, for example, as a coloring agent by the steps of adding the coloring agent and other additives to a polymerizable monomer and subjecting the resultant mixture to emulsion or suspension polymerization. These methods are capable of eliminating the drawbacks of the conventional crushing method to a considerably large extent. Since these methods involve absolutely no step of crushing, the particles produced thereby required no improvement in brittleness and these particles are globular in shape and therefore excellent in flowability and enjoy uniformity of triboelectric property.

The methods which rely on the technique of suspension polymerization for the production of a toner, however, possess a problem of their own. For example, the coloring matter, particularly carbon black, to be added is not uniformly dispersed and the uniform dispersion of the coloring agent aggravates the dispersion in the electric resistance and the triboelectricity of the toner particles. For the production of a toner capable of forming an image of excellent quality, therefore, these methods have room for further technical improvement.

Concerning this particular problem, as means of improving the dispersibility of carbon black in the polymerizing monomer, a method which consists in defining the kind of carbon black to be used (Japanese Patent Laid-Open SHO 56(1981)-106,250 and a method which comprises treating the carbon black with a coupling agent such as triethoxy silane (G.B. 1,583,564 or G.B. 1,583,411) have been proposed. These methods are not practicable because the dispersion of carbon black in the polymerizing monomer is not perfect and tends to increase the cost. There has also been proposed a method which resides in using a grafted carbon black obtained by polymerizing a monomer component in the presence of carbon black (DE 3,102,823). In this method, since the grafting ratio is low, the dispersion of the grafted carbon black in the polymerizing monomer is not obtained to a sufficient extent.

Where carbon black is added as a coloring agent and an electric charging agent for incorporation in a thermoplastic resin composition, a coating composition, a thermosensitive transfer ink ribbon coating agent, a thermosensitive transfer ink, a thermosetting resin composition, a back-coat of magnetic recording medium, or a charge control agent, the cohesive force generated between the particles of carbon black is so strong that it is extremely difficult for the carbon black to be uniformly mixed or dispersed under ordinary mixing or dispersing conditions.

An object of the present invention, therefore, is to provide novel colored microfine globular particles, a method for the production thereof, and uses thereof.

Another object of this invention is to provide colored microfine globular particles which have carbon black uniformly dispersed therein and are usable as a toner for the development of images of static charge, as a filler for thermoplastic resin compositions and coating compositions, as a coating agent for thermosensitive transfer ink ribbons, as a coloring agent for thermosensitive transfer ink, thermosetting resin compositions, and back-coats in magnetic recording media, and as a charge control agent, a method for the production of the colored microfine globular particles, and uses of the colored microfine globular particles.

Disclosure of Invention

The objects described above are accomplished by colored microfine globular particles which are obtained by causing carbon black to react with a polymer capable of reacting with the carbon black, dispersing the resultant carbon black-graft polymer in a polymerizable monomer component, and then polymerizing the polymerizable monomer component.

These objects are further accomplished by a method for the production of colored microfine globular particles which comprises causing carbon black to react at a temperature in the range of 20° to 350° C. with a polymer capable of reacting with the carbon black, dispersing the resultant carbon black-graft polymer in a polymerizable monomer component, and then polymerizing the polymerizable monomer component.

The colored microfine globular particles can be used by themselves as a toner for the development of an image of static charge. In a form combined with a varying resinous binder, solvent, etc., they exhibit a highly desirably performance as a coloring agent or an antistatic agent for thermoplastic resin compositions, coating compositions, thermosensitive transfer ink ribbon coating agents, thermosensitive transfer inks, thermosetting resin compositions, and back-coats of magnetic recording media.

Best Mode for Carrying Out the Invention

This invention concerns colored microfine globular particles which are obtained by causing carbon black to react with a polymer capable of reacting with the carbon black, dispersing the resultant carbon black-graft polymer, and then polymerizing the polymerizable monomer component.

For the production of the carbon black-graft polymer, the present invention utilizes the reactivity of the functional groups (such as, for example, —OH, —COOH, and >C=O) on the surface of the carbon black. The polymer to be used for the reaction with the carbon black is not specifically limited so long as it fulfills the sole requirement that it should possess a reactive group capable of easily reacting with the functional groups present on the surface of the carbon black. Examples of the reactive group capable of easily reacting with the functional groups present on the surface of the carbon black include aziridine group, oxazoline group, N-hydroxyalkylamide group, epoxy group, thioepoxy group, isocyanate group, vinyl group, silicon type hydrolyzing group, and amino group. At least one group selected from the groups cited above is available for the reaction under discussion.

As examples of the polymer possessing reactivity with carbon black as described above, there can be cited vinyl polymers, polyesters, and polyethers which possess at least one of the aforementioned reactive groups in the molecular unit thereof. Though the molecular weight of the polymer possessing the reactivity is not specifically limited, the polymer is desired to possess a number average molecular weight in the range of 500 to 1,000,000, more preferably 1,000 to 500,000, and most preferably 2,000 to 100,000 in the light of the desirability of ensuring manifestation of a conspicuous effect of treatment on the carbon black and facilitating the work involved in the reaction with the carbon black. The polymer must possess at least one such reactive group on the average within the molecular unit thereof. Since the dispersibility of carbon black-graft polymer in the other substance is degraded in proportion as the amount of the reactive group is increased, the number of the reactive groups contained on the average in the molecular unit is 1 to 5, preferably 1 or 2, and ideally 1.

For the production of a polymer possessing the reactivity with carbon black as described above, a method which causes a polymerizable monomer possessing the reactive group within the molecular unit thereof to be polymerized by the conventional procedure, when necessary, in combination with other polymerizable monomer or a method which causes the compound possessing the reactive group in the molecular unit thereof to react with a polymer possessing a group capable of reacting the aforementioned compound can be suitably adopted. In the present invention, it is desirable particularly from the standpoint of reactivity with the functional group present on the surface of carbon black to use a polymer possessing at least one reactive group selected from the class consisting of aziridine group, oxazoline group, N-hydroxyalkylamide group, epoxy group, thioepoxy group, and isocyanate group. More desirably, a polymer which possesses at least one reactive group selected from the class consisting of aziridine group, oxazoline group, and epoxy group is used. The most desirable polymer possesses at least one reactive group selected from the class consisting of aziridine group and oxazoline group. Further in due consideration of the affinity the carbon black-graft polymer is to exhibit for a polymerizable monomer component used for suspension polymerization of the graft polymer, it is particularly desirable to use a vinyl type polymer possessing such a reactive group as mentioned above.

As means of producing the polymer possessing the reactivity with carbon black, there can be cited (1) a method which causes a polymerizable monomer possessing the reactive group in the molecular unit thereof to be polymerized, when necessary, in combination with other polymerizable monomer and (2) a method which causes a compound possessing the reactive group in the molecular unit thereof to react with a polymer capable of reacting with the compound to effect introduction of the reactive group in the polymer.

As examples of the polymerizable monomer possessing the aforementioned reactive group, there can be cited aziridine group-containing polymerizable monomers represented by the following formulae:

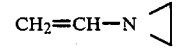

-continued

CH$_2$=CH—CH$_2$—N⟨

CH$_2$=CH—C$_6$H$_4$—N⟨

CH$_2$=CH(CH$_3$)—C$_6$H$_4$—N⟨

CH$_2$=CH—C$_6$H$_4$—CH$_2$—N⟨

CH$_2$=C(CH$_3$)—C$_6$H$_4$—CH$_2$—N⟨

CH$_2$=CH—C$_6$H$_4$—CH$_2$CH$_2$—N⟨

CH$_2$=C(CH$_3$)—C$_6$H$_4$—CH$_2$CH$_2$—N⟨

CH$_2$=CH—NHCO—C$_6$H$_4$—N⟨

CH$_2$=C(CH$_3$)—NHCO—C$_6$H$_4$—N⟨

CH$_2$=CH—COO—CH$_2$CH$_2$—N⟨

CH$_2$=C(CH$_3$)—COO—CH$_2$CH$_2$—N⟨

CH$_2$=CH—COO—CH$_2$CH$_2$—N⟨^{CH_3}

CH$_2$=C(CH$_3$)—COO—CH$_2$CH$_2$—N⟨^{CH_3}

CH$_2$=CH—COO—CH$_2$CH$_2$—N⟨^{CH_3}_{CH_3}

CH$_2$=C(CH$_3$)—COO—CH$_2$CH$_2$—N⟨^{CH_3}_{CH_3}

CH$_2$=CH—COO—CH$_2$CH$_2$—N⟨^{C_2H_5}

CH$_2$=C(CH$_3$)—COO—CH$_2$CH$_2$—N⟨^{C_2H_5}

-continued

CH$_2$=CH—COO—CH(CH$_3$)—CH$_2$—N⟨

CH$_2$=C(CH$_3$)—COO—CH(CH$_3$)—CH$_2$—N⟨

CH$_2$=CH—COO$(\!$CH$_2$CH$_2$O$)_{\overline{n}}$CH$_2$CH$_2$—N⟨

CH$_2$=C(CH$_3$)—COO$(\!$CH$_2$CH$_2$O$)_{\overline{n}}$CH$_2$CH$_2$—N⟨

CH$_2$=CH—COO$(\!$CH$_2$CH$_2$O$)_{\overline{n}}$CO—CH$_2$CH$_2$—N⟨

CH$_2$=C(CH$_3$)—COO$(\!$CH$_2$CH$_2$O$)_{\overline{n}}$CO—CH$_2$CH$_2$—N⟨

$\begin{array}{l}\text{CH}_2\text{—CH}_2\text{O—CO—CH=CH}_2\\ \text{CH—CH}_2\text{O—COCH}_2\text{—CH}_2\text{—N⟨}\\ \text{CH}_2\text{—CH}_2\text{O—CO—CH=CH}_2\end{array}$ $\begin{array}{l}\text{CH}_2\text{—CH}_2\text{O—CO—C(CH}_3\text{)=CH}_2\\ \text{CH—CH}_2\text{O—COCH}_2\text{—CH}_2\text{—N⟨}\\ \text{CH}_2\text{—CH}_2\text{O—CO—C(CH}_3\text{)=CH}_2\end{array}$ $\begin{array}{l}\phantom{\text{CH}_3\text{—CH}_2\text{—C—}}\text{CH}_2\text{O—CO—CH=CH}_2\\ \text{CH}_3\text{—CH}_2\text{—C—CH}_2\text{O—COCH}_2\text{—CH}_2\text{—N⟨}\\ \phantom{\text{CH}_3\text{—CH}_2\text{—C—}}\text{CH}_2\text{O—CO—CH=CH}_2\end{array}$ $\begin{array}{l}\phantom{\text{CH}_3\text{—CH}_2\text{—C—}}\text{CH}_2\text{O—CO—C(CH}_3\text{)=CH}_2\\ \text{CH}_3\text{—CH}_2\text{—C—CH}_2\text{O—COCH}_2\text{—CH}_2\text{—N⟨}\\ \phantom{\text{CH}_3\text{—CH}_2\text{—C—}}\text{CH}_2\text{O—CO—C(CH}_3\text{)=CH}_2\end{array}$

CH$_2$=CH—CO—N⟨

CH$_2$=C(CH$_3$)—CO—N⟨

CH$_2$=CH—OCO—N⟨

CH$_2$=C(CH$_3$)—OCO—N⟨

CH$_2$=CH—SO$_2$—N⟨

CH$_2$=C(CH$_3$)—SO$_2$—N⟨

CH$_2$=CH—NHCO—N⟨

CH$_2$=C(CH$_3$)—NHCO—N⟨

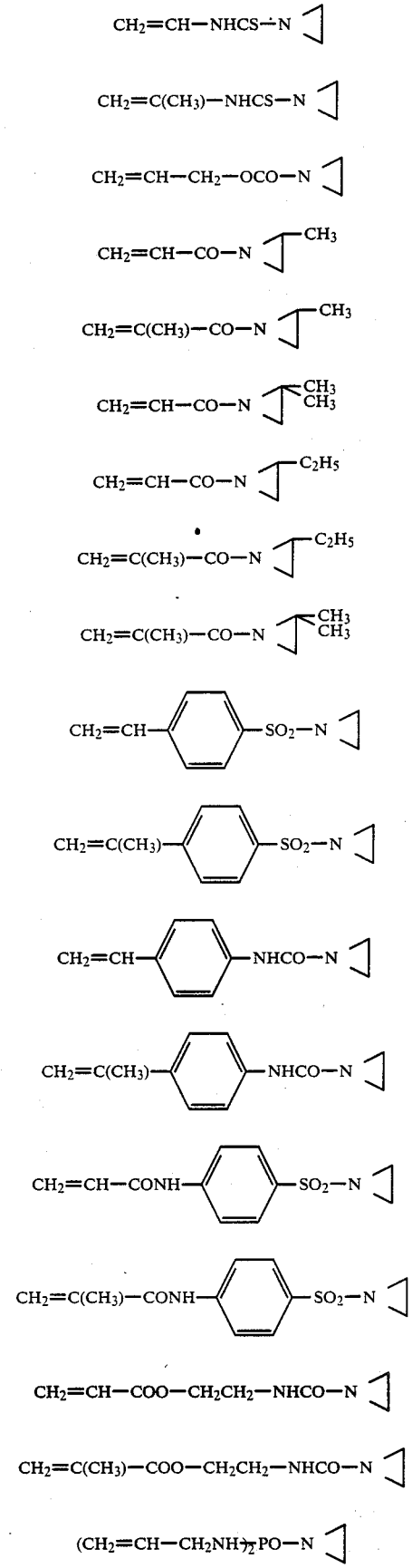

oxazoline group-containing polymerizable monomers such as 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-5-ethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, and 2-isopropenyl-4,5-dimethyl-2-oxazoline; N-hydroxy alkylamide group-containing polymerizable monomers such as N-hydroxymethyl acrylamide, N-hydroxyethyl acrylamide, N-hydroxybutyl acrylamide, N-hydroxyisobutyl acrylamide, N-hydroxy-2-ethylhexyl acrylamide, N-hydroxycyclohexyl acrylamide, N-hydroxymethyl methacrylamide, N-hydroxyethyl methacrylamide, N-hydroxybutyl methacrylamide, N-hydroxyisobutyl methacrylamide, N-hydroxy-2-ethylhexyl methacrylamide, and N-hydroxycyclohexyl methacrylamide; epoxy group-containing polymerizable monomers represented by the following formulae:

-continued

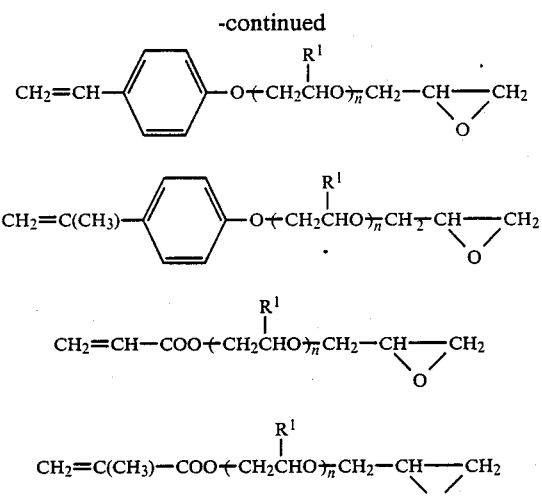

wherein R¹ stands for a hydrogen atom or a methyl group and n for 0 or an integer in the range of 1 to 20; and thioepoxy group-containing polymerizable monomers represented by the following formulae:

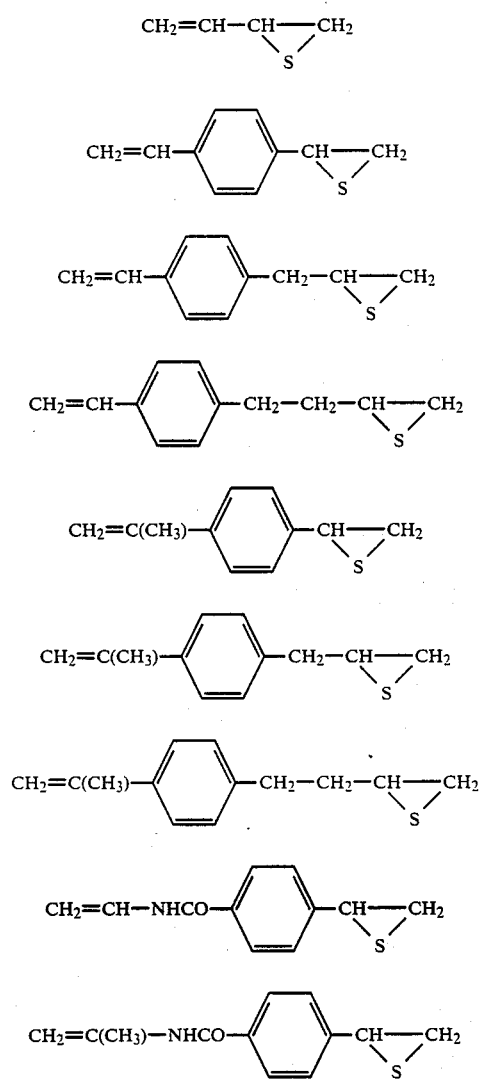

-continued

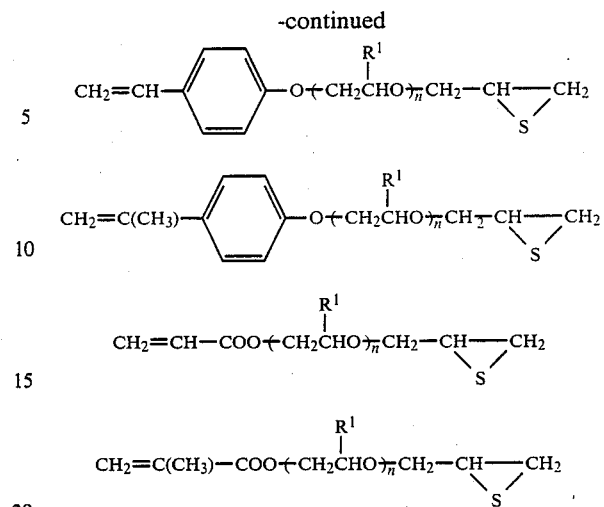

wherein R¹ and n have the same means as defined above in the case of the epoxy group-containing polymerizable monomers; isocyanate-containing polymerizable monomers such as $CH_2=CHCOCH_2CH_2NCO$, $CH_2=C(CH_3)COCH_2CH_2NCO$ and

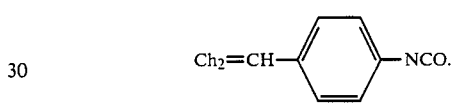

One member or a mixture of two or more members selected from the group of monomers cited above can be suitably used.

The monomer which is optionally used in combination with the monomer described above is not specifically restricted so long as it meets the sole requirement that it should be copolymerizable with the monomer (a). As examples of the monomer which answer the description, there can be cited styrene type monomers such as styrene, o-methyl styrene, m-methyl styrene, p-methyl styrene, α-methyl styrene, p-methoxy styrene, p-tert-butyl styrene, p-phenyl styrene, o-chlorostyrene, m-chlorostyrene, and p-chlorostyrene; acrylic acid or methacrylic acid type monomers such as acrylic acid, methyl acrylate, ethyl acrylate, n-butyl acrylate, isobutyl acrylate, dodecyl acrylate, stearyl acrylate, 2-ethylhexyl acrylate, methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, and stearyl methacrylate; and ethylene, propylene, butylene, vinyl chloride, vinyl acetate, acrylonitrile, acrylamide, methacrylamide, and N-vinyl pyrrolidone. One member or a mixture of two or more members selected from the monomers cited above may be suitably used.

Examples of the compound possessing the reactive group and used for the method of (2) include (a) compounds possessing two or more of reactive groups of one species in the molecular unit thereof, (b) compounds possessing two or more reactive groups of different species in the molecular unit thereof, and (c) compounds possessing at least one reactive group and other group than the reactive group in the molecular unit thereof.

Examples of the polymer to be used in the method of (2) include vinyl type polymers, polyesters, and polyethers which possess groups capable of reacting with compounds possessing the aforementioned reactive group.

As examples of the group capable of reacting with the aforementioned compounds, there can be cited hydroxyl group, carboxyl group, amino group, and epoxy group. The polymer possessing such a group can be easily produced by any of the conventional procedures of polymerization such as radical polymerization and polycondensation. By the method of (2), the polymer possessing the reactive group can be produced by causing the aforementioned compound to react with the polymer under conditions such that at least one of the reactive groups will remain unaltered through the reaction.

In the reaction system in which the carbon black is caused to react with a polymer possessing reactivity with the carbon black, such substances as a polymer component other than the aforementioned polymer, a polymerizable monomer, and an organic solvent may be present.

Typically, the reaction of the carbon black with the polymer possessing the reactivity with the carbon black is accomplished by stirring 100 parts by weight of the carbon black with 1 to 3,000 parts by weight, preferably 5 to 1,000 parts by weight, of the polymer possessing the reactivity with the carbon black, 0 to 1,000 parts by weight of a polymer possessing no reactivity with the carbon black, 0 to 200 parts by weight of a polymerizable monomer, and 0 to 1,000 parts by weight of an organic solvent at a temperature in the range of 20° to 350° C., preferably 50° to 300° C. In this reaction, the reactive group in the polymer possessing the reactive group forms an important factor. When the reactive group is an isocyanate group, a heat treatment which aims to dehydrate is required previously, because water contained in the carbon black inhibits smooth progress of the reaction. When the reactive groups is an epoxy group, carbon black possessing a pH value of not more than 8, preferably not more than 6, should be selected, because the carbon black possessing high pH value decreases reactivity. When the reactive group is an aziridine group or an oxazoline group, it is most preferable because more wide range of carbon black to be used can be selected as well as pretreatments such as heating are not required. The pH value of the carbon black is determined by the testing method defined by Japanese Industrial Standard (JIS) K 6221.

In the present invention, the colored microfine globular particles are produced by dispersing a polymerizable monomer in the carbon black-graft polymer and thereafter polymerizing the polymerizable monomer by the conventional procedure. One example of the polymerizable monomer is the aforementioned other polymerizable monomer which, when necessary, is used in combination with the polymerizable monomer possessing the reactive group in the molecular unit thereof during the course of the production of the polymer possessing reactivity with the carbon black.

The polymerizable monomer mentioned above may incorporate therein at least 0.005% by weight of a cross-linking compound. The allowable content of the cross-linkable compound is in the range of 0.01 to 80% by weight, preferably 0.05 to 20% by weight. Particularly when the produced colored microfine globular particles are intended to be used as a toner for the development of images of static charge, the content of the cross-linkable compound is in the range of 0.005 to 20% by weight, preferably 0.05 to 10 % by weight.

Examples of the cross-linkable compound are as follows:

(A) Compounds possessing at least two polymerizable unsaturated groups in the molecular unit thereof.

(B) Compounds possessing at least one polymerizable unsaturated group and at least one functional group selected from the class consisting of carboxyl group, sulfonyl group, and phenol group in the molecular unit thereof.

(C) Compounds possessing at least two functional groups capable of being cross-linked through addition or condensation reaction caused by suitable means as heating or exposure to an active energy ray.

(D) Ionically cross-linkable compounds such as polyvalent metal compounds, and (E) Compounds capable of generating at least two radicals in the molecular unit thereof by suitable means such as heating, exposure to an active energy ray, or use of a polymerization initiator during the course of the polymerization of the polymerizable monomer component.

Typical examples of the compound of the type (A) include aromatic divinyl compounds such as divinyl benzene, divinyl naphthalene, and derivatives thereof, diethylenically unsaturated carboxylic esters such as ethylene glycol dimethacrylate, diethylene glycol dimethacrylate, triethylene glycol dimethacrylate, trimethylol propane triacrylate, allyl methacrylate, t-butylaminoethyl methacrylate, tetraethylene glycol dimethacrylate, and 1,3-butane diol dimethacrylate, divinyl compounds such as N,N-divinyl aniline, divinyl ether, divinyl sulfide, and divinyl sulfonic acid, and compounds possessing three or more vinyl groups.

Further, polybutadiene, polyisoprene, unsaturated polyesters and reactive polymers described in Japanese Patent Publication SHO 57(1982)-56507, Japanese Patent Laid-Opens SHO 59(1984)-221304, SHO 59(1984)-221305 and SHO 59(1984)-221306 and the like can be used.

The compound of the type (B) is such that, during the course of the polymerization of the monomer component, it will react with the reactive group, i.e. an aziridine group, an oxazoline group, or an epoxy group, remaining in the polymer moiety of the carbon black-graft polymer and will impart a cross-linked structure to the produced colored microfine globular particles. In this case, for the purpose of enabling the cross-linking reaction to proceed efficiently, the polymerizable monomer component may incorporate therein a monomer (B-i) possessing a functional group such as aziridine group, oxazoline group, epoxy group, N-hydroxy alkylamide group, or thioepoxy group. As typical examples of the monomer (B-i), there can be cited the following compounds:

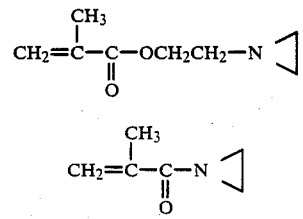

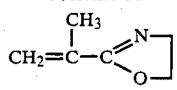

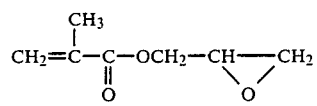

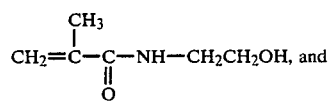

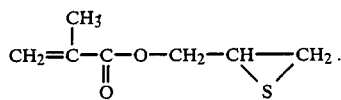

The compound of the type (C) is a low molecular weight compound or a high molecular weight compound possessing at least two functional groups such as epoxy group, oxazoline group, etc. within the molecular unit thereof. As concrete examples of the compound, there can be cited polyepoxy (produced by Nagase Kasei Kogyo Kabushiki Kaisha and marketed under trademark designation of "Denacol EX-211", "Denacol EX-313", "Denacol-EX-314" and "Denacol EX-321")2-p-phenylene-bis-2-oxazoline, 2,2'-(1,3-phenylene)-bis(-2-oxazoline), 2-(1-aziridinyl)-2-oxazoline, and RPS (a reactive polystyrene produced by The Dow Chemical Co.). The RPS is a compound represented by the following general formula:

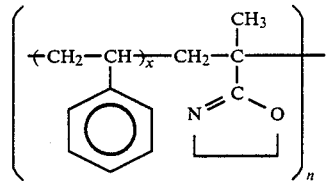

wherein X stands for 99 and n for an integer of 4 or 5. When the cross-linking reaction is effected by the use of this compound of the type (C), the polymerizable monomer component must contain therein a monomer (C-i) possessing a group capable of reacting the functional group possessing by the compound (C).

A compound of the type (B), for example, answer the description of the monomer (C-i).

As concrete examples of the compound of the type (D), there can be cited ZnO, Zn(OH)$_2$, Al$_2$O$_3$, Al(OH)$_3$, MgO, Mg(OH)$_2$, sodium methoxide, and sodium ethoxide. Where the cross-linking reaction is carried out by the use of a compound of the type (D), the polymerizable monomer component must contain a compound of the type (B).

Examples of the compound of the type (E) include chlorosulfonated polyolefins represented by the following general formula:

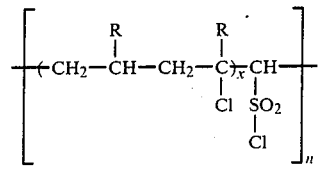

wherein R stands for H or CH$_3$, X for an integer in the range of 3 to 400, and n for an integer of the value of at least 2.

In the polymerization of the polymerizable monomer, the monomer may incorporate therein other polymer such as, for example, a polyester. It may further incorporate suitably therein other coloring agent for the adjustment of hue, a chain transfer agent for the adjustment of polymerization degree, or any of the conventional additives.

The colored microfine globular particles produced by the present invention are desired to possess particle diameters in the range of 1 to 100 microns for the purpose of facilitating their handling and, while used in various applications, enabling them to manifest their effect conspicuously. As regards the type of the polymerization to be performed on the monomer component, suspension polymerization proves to be desirable in the sense that it enables the colored microfine globular particles of the aforementioned particle diameters to be produced immediately on completion of the polymerization.

The suspension polymerization is carried out in the presence of a stabilizer. Examples of the stabilizer are such water-soluble macromolecular compounds as polyvinyl alcohol, starch, methyl cellulose, carboxymethyl cellulose, hydroxyethyl cellulose, polysodium acrylate, and polysodium methacrylate. Other examples are barium sulfate, calcium sulfate, barium carbonate, magnesium carbonate, calcium phosphate, talc, clay, diatomaceous earth, and powdered metal oxides. The stabilizer is used in an amount falling in the range of 0.01 to 20% by weight, preferably 0.1 to 10 % by weight, based on the amount of the polymerizable monomer.

As a polymerization initiator for use in the polymerization, there can be adopted any of the conventional oil-soluble peroxide type or azo type initiators. Typical examples of the polymerization initiator include peroxide type initiators such as benzoyl peroxide, lauroyl peroxide, octanoyl peroxide, benzoyl orthochloroperoxide, benzoyl orthomethoxyperoxide, methylethyl ketone peroxide, diisopropyl peroxy dicarbonate, cumene hydroperoxide, cyclohexanone peroxide, t-butyl hydroperoxide, and diisopropyl benzene hydroperoxide, and 2,2'-azo-bis-isobutyronitrile, 2,2'-azo-bis-(2,4-dimethyl valeronitrile), 2,2'-azo-bis-2,3-dimethyl butyronitrile, 2,2'-azo-bis-(2-methyl butyronitrile), 2,2'-azo-bis-2,3,3-trimethyl butyronitrile, 2,2'-azo-bis-2-isopropyl butyronitrile, 1,1'-azo-bis-(cyclohexane-1-carbonitrile), 2,2'-azo-bis-(4-methoxy-2,4-dimethyl valeronitrile), 4,4'-azo-bis-4-cyanovaleic acid, 2-(carbamoylazo)-isobutyronitrile, and dimethyl-2-2'-azo-bis-isobutyrate. Desirably the polymerization initiator is used in an amount falling in the range of 0.01 to 20% by weight, preferably 0.1 to 10% by weight, based on the amount of the polymerizable monomer.

The colored microfine globular particles of the present invention obtained as described above assume a globular shape permitting free control of particle diameters and particle diameter distribution. Moreover, they have the carbon black-graft polymer i.e. a coloring component, dispersed uniformly therein.

The toner contemplated by this invention for use in the development of images of static charge, comprises the aforementioned colored microfine globular particles. The colored microfine globular particles may be used in their unmodified form as the toner for the development of images of static charge. They may incorporate therein additives such as an electric charge control agent for the adjustment of electric charge and a fluidizing agent which are normally used in the conventional toner.

The method by which the electric charge control agent is incorporated in the colored microfine globular particles is not specifically defined. The incorporation can be effected by any of the conventional methods available for the purpose. For example, a method which causes the electric charge control agent to be contained in the polymerizable monomer having the carbon black-graft polymer dispersed therein before the monomer is subjected to polymerization or a method which causes the electric charge control agent to be deposited on the surface of the colored microfine globular particles after the particles have been produced may be suitably adopted.

One use found for the colored microfine globular particles is as a coloring agent for thermoplastic resins and thermosetting resins.

Examples of the thermoplastic resin for which the coloring agent is used include saturated polyester resins such as polyethylene terephthalate and polybutylene terephthalate, acrylic resins such as methyl methacrylate resin, polycarbonates, polyimides, vinyl chloride polymer, styrene polymer, polyamides, polyolefins, butyral resin, and polyurethane.

Examples of the thermosetting resin include unsaturated polyester resins produced by dissolving unsaturated polyesters with polymerizable monomers represented by styrene, epoxy resins, diallyl phthalate resin, phenol resins, amino resins represented by melamine resin, polyimide resin, and polyurethane resin.

Though the content of the colored microfine globular particles in the thermoplastic resin or thermosetting resin is not specifically defined, it is generally in the range of 5 to 70% by weight, preferably 10 to 40% by weight. If this content is less than 5% by weight, it is difficult to obtain a thermoplastic or thermosetting resin composition excelling in coloring property, electroconductivity, thermal stability, wear resistance, and low shrinkability. Conversely, if the content is unduly large, there arises a disadvantage that the resin composition possesses inferior quality.

Another use found for the colored microfine globular particles is as a coating composition. Examples of the binder to be in the production of the coating composition include thermoplastic resins, thermosetting resins, and reactive resins which are capable of forming a film on being applied on a substrate. One member or a mixture of two or more members selected from the group of resins cited above may be suitably adopted, depending on the purpose for which the eventually produced resin composition is used.

To be used advantageously for the production of the resin composition, the thermoplastic resin is required to possess an average molecular weight approximately in the range of 1,000 to 1,000,000. As typical examples of the thermoplastic resin, there can be cited vinyl chloride type resins such as vinyl chloride polymer and vinyl chloride-vinylidene chloride copolymer; vinyl ester type resin such as vinyl acetate polymer, vinyl acetate-ethylene copolymer, and vinyl acetate-methyl methacrylate copolymer; (meth)acrylic ester type resins such as (meth)acrylic ester (co)polymers, (meth)acrylic ester-acrylonitrile copolymers, and (meth)acrylic ester-styrene copolymer; styrene type resins such as styrene polymer, styrene-butadiene copolymer, and styrene-butadiene-acrylonitrile copolymer; polyamide type resins such as poly( s-caprolactam) and condensate of adipic acid with hexamethylene diamine; polyester type resins such as condensate of terephthalic acid with ethylene glycol and condensate of adipic acid with ethylene glycol; polyolefin type resins such as polyethylene, chlorinated polypropylene, carboxyl-modified polyethylene, polyisobutylene, and polybutadiene; cellulose derivatives such as cellulose acetate, cellulose propionate, and nitrocellulose; and butyral resins. These resins are commercially available and are usable in their unmodified form in the present invention or they may be synthetized by the conventional method and put to use without any modification.

The thermosetting resin or reactive resin, on being heated, exposed to active energy ray, dried, or otherwise treated suitably during the course of or subsequently to the formation of film, is enabled to form a cross-linked structure due to addition reaction or condensation reaction. As typical examples of the thermosetting resin or reactive resin, there can be cited phenol type resins such as novolak resin and resol resin; amino type resins such as urea resin, melamine resin, and benzoguanamine resin; various alkyd resins; unsaturated polyester resins; curing acrylic type resins; urethane-modified resins such as isocyanate group-containing polyesters, and isocyanate group-containing polyethers; polyamine type resins; and epoxy resins.

The binder mentioned above ought to be selected so as to suit tight adhesiveness and wettability relative to the substrate to be coated, hardness, flexibility, chemical resistance, antifouling property, and weatherability required of the coat to be produced. One member or a mixture of two or more members selected from the group of binders cited above may be suitably used, in due consideration of the purpose for which the coating composition is to be used.

The coating composition containing the colored microfine globular particles of the present invention can be obtained by dispersing the colored microfine globular particles in a varying binder. The ratio of the colored microfine globular particles to the binder in the coating composition is not specifically defined. For the purpose of enabling the coating composition to manifest the properties fully without impairing the quality of the produced coat, the amount of the colored microfine globular particles is in the range of 5 to 300 parts by weight, preferably 10 to 200 parts by weight, based on 100 parts by weight of the binder.

The carbon black-containing coating composition of the present invention may suitably incorporated therein, besides the aforementioned components, well-known additives heretofore generally used in coating compositions in amounts not exceeding the limits within which the effect of the coating composition is not impaired. As examples of the additives, there can be cited dispersion aids such as metallic soap and surfactant, film-forming aid, antistatic agent, defoaming agent, and inorganic fillers and pigments such as silica, talc, calcium carbonate, and titanium dioxide.

The thermosensitive transfer ink of the present invention is produced by dispersing the colored microfine globular particles in a binder component. As examples of the binder component for the thermosensitive transfer ink, there can be cited natural or synthetic waxes such a carnauba wax, montan wax, paraffin wax, microcrystalline wax, oxide wax, low molecular weight polyethylene wax, and low molecular weight polypropylene wax; and synthetic resins such as polysulfone ether, polycarbonate, polystyrene, silicone resin, and acrylic type resins. As means of effecting this dispersion, a method which simply mixes the colored microfine globular particles with the binder component and a method which mixes these two components in a suitable organic solvent are conceivable. By either of these methods, there is produced a thermosensitive transfer ink in which the colored microfine globular particles are very uniformly dispersed in the binder component. Though the amount of the colored microfine globular particles in the thermosensitive transfer ink is not specifically defined, it generally falls in the range of 5 to 80% by weight, preferably 20 to 60 % by weight, based on the amount of the thermosetting transfer ink. This thermosensitive transfer ink, when necessary, may incorporate therein of the conventional additives beside the aforementioned components.

The thermosensitive transfer ink of the present invention can be applied by the conventional technique using a hot melt coater, a reverse roll coater, or a gravure roll coater on a varying substrate such as, for example, PET film, polyimide film, condenser paper, silk cloth, or aluminum foil to give rise to a thermosensitive transfer ink sheet possessing excellent quality.

Another use found for the colored microfine globular particles is as a thermosensitive transfer ink ribbon coating agent. Examples of the binder component for the ribbon coating agent include such conventional resins as vinyl chloride polymer, vinyl chloride-vinyl acetate copolymer, acrylic type resins, styrene polymer, polyurethane resin, and polyester resins. The ribbon coating agent is produced by thoroughly stirring the colored microfine globular particles in the binder. The amount of the colored microfine globular particles incorporated in the coating agent is in the range of 1 to 40 % by weight, preferably 5 to 20 % by weight, based on the amount of the coating agent. The ribbon coating agent thus obtained is applied on a substrate by the conventional technique using a roll coater, an air knife coater, an air doctor coater, or a spray coater. Optionally, a ribbon coat layer may be formed on the rear side of the substrate.

Yet another use found for the colored microfine globular particles is as a back-coating agent for a magnetic recording medium. Examples of the binder component for the back-coating agent include such conventional resins as vinyl chloride type resins, vinyl chloride-vinyl acetate copolymer type resins, acrylic type resins, styrene type resins, polyurethane type resins, and polyester type resins. The back-coating agent is produced by thorough stirring the colored microfine globular particles in the aforementioned binder component. Though the amount of the colored microfine globular particles to be incorporated in the coating agent is not specifically defined, it is generally in the range of 1 to 40% by weight, preferably 5 to 20 % by weight, based on the amount of the coating agent. The back-coating agent obtained as described above is applied on a substrate by the conventional technique using a roll coater, an air knife coater, an air doctor coater, or a spray coater. Optionally, a back-coat layer may be formed on the rear side of the substrate.

As examples of the substrate for the magnetic recording medium of the present invention, there can be cited such conventional materials as films, sheets, and tapes of polyester, cellulose acetate, and polyvinyl chloride. The magnetic recording layer can be formed by a method which applies a coating agent containing magnetic powder or a method which deposits a magnetic substance by vacuum deposition, for example.

Now, the present invention will be described more specifically below with reference to working examples. It should be noted, however, that the present invention is not limited by the following examples. Wherever parts are mentioned, they are meant invariably as parts by weight.

Synthesis 1

A flask provided with a stirrer, an inert gas introducing tube, a reflux condenser, and a thermometer was charged with 200 parts of deionized water having 0.1 part of polyvinyl alcohol dissolved therein. A mixture having 8 parts of benzoyl peroxide dissolved in a polymerizable monomer prepared in advance with 98 parts of styrene and 2 parts of isopropenyl oxazoline was added to the contents of the flask and stirred therein at a high speed to give rise to a homogeneous suspension. Then, the suspension was heated to 80° C. with nitrogen gas continuously blown therein. It was kept stirred at 80° C. for 5 hours to effect polymerization. Subsequently, it was cooled to obtain a polymer suspension. This polymer suspension was filtered and the polymer consequently separated was washed and dried to obtain a polymer possessing an oxazoline group as a reactive group.

In a pulverizing machine (produced by Toyo Seiki Co., Ltd. and marketed under trademark designation of "Laboplastmill"), 40 parts of the polymer possessing an oxazoline group as a reactive group and 20 parts of carbon black (produced by Mitsubishi Chemical Industries, Ltd., and marketed under product code "MA-600") were mixed under the conditions of 160° C. and 100 rpm to induce reaction thereof and then cooled and pulverized to obtain carbon black-graft polymer (1).

Synthesis 2

A polymer possessing an epoxy group as a reactive group was obtained by repeating the procedure of Synthesis 1, except that 75 parts of styrene, 22.5 parts of methyl methacrylate, and 2.5 parts of glycidyl methacrylate were used instead as polymerizable monomers.

In the Laboplastmill, 45 parts of the polymer possessing an epoxy group as a reactive group and 15 parts of carbon black (produced by Mitsubishi Chemical Industries, Ltd. and marketed under product code of "MA-100R") were stirred under the conditions of 220° C. and 100 rpm to induce reaction thereof and then cooled and pulverized to obtain carbon black-graft polymer (2).

Synthesis 3

A carbon black-graft polymer (3) was obtained by repeating the procedure of Synthesis 1, except that 95 parts of styrene, 3 parts of n-butyl acrylate, and 2 parts of N-hydroxyethyl methacrylamide were used instead as polymerizable monomers.

Synthesis 4

In a flask provided with a dropping funnel, a stirrer, an inert gas introducing tube, a reflux condenser, and a thermometer, 100 parts of toluene and 100 parts of methyl isobutyl ketone were heated to 80° C. with nitrogen gas continuously blown therein. To the hot contents of the flask, a mixture prepared in advance by dissolving 2 parts of benzoyl peroxide in a polymerizable monomer containing 97 parts of styrene and 3 parts of 2-(1-aziridinyl)-ethyl methacrylate was added dropwise through the dropping funnel over a period of 2 hours. The contents of the flask were further stirred for 5 hours to induce polymerization and then cooled, to obtain a polymer. By addition of 7,000 parts of methanol, this polymer solution was reprecipitated. The precipitate was dried to afford a polymer possessing an aziridine group as a reactive group.

By causing 40 parts of the polymer possessing an aziridine group as a reactive group to react with 20 parts of carbon black MA-600 in the same manner as in synthesis 1 and cooling and crushing the resultant product of the reaction, there was obtained a carbon black-graft polymer (4).

Synthesis 5

In the same flask as used in Synthesis 4, 217 parts of toluene was heated to 90° C. with nitrogen gas continuously blown therein. To the hot toluene, a mixture prepared in advance by dissolving 4.61 parts of mercaptoethanol and 1.32 parts of azo-bis-isobutylonitrile in a polymerizable monomer containing 480 parts of styrene and 20 parts of n-butyl acrylate was added dropwise through the dropping funnel over a period of 2 hours. The contents of the flask were stirred continuously for 5 hours to effect polymerization. Then, 185.1 g of the reaction product (a solution containing a prepolymer possessing a hydroxyl group at the terminal thereof) and 0.1 g of . dibutyl tin dilaurate and 2.38g of 2,4-toluylene diisocyanate added thereto were left reacting at 80° C. for 30 minutes, to afford a polymer solution (non-volatile content 70%) possessing an isocyanate group as a reactive group at the terminal thereof. In the Laboplastmill, 57.1 parts of the polymer solution (non-volatile content 70%) possessing an isocyanate group as a reactive group at the terminal and 20 parts of carbon black (produced by Mitsubishi Chemical Industries, Ltd. and marketed under product code of "MA-100R") dried in advance at 200° C. for 2 hours were mixed under the conditions of 160° C. and 100 rpm to effect reaction and removal of solvent. The resultant reaction product was cooled and crushed to afford a carbon black-graft polymer (5).

Synthesis 6

A carbon black-graft polymer (6) was obtained by repeating the procedure of Synthesis 1, except that 50 parts of styrene and 50 parts of divinylbenzene were used instead as polymerizable monomers.

Control synthesis 1

In the same flask as used in Synthesis 1, 48 parts of styrene and 12 parts of carbon black MA-600, were heated to 140° C. with nitrogen gas continuously blown therein. The contents of the flask were stirred at 140° C. for 5 hours to effect polymerization and then cooled. After completion of the reaction, the reaction product was combined with 300 parts of toluene and then, by addition of 7,000 parts of methanol, was reprecipitated to afford a grafted carbon black (1) for comparison.

Example 1

In the same flask as used in Synthesis 1, 897. parts of deionized water having 3 parts of polyvinyl alcohol (produced by Kuraray Co., Ltd. and marketed under trademark designation of "PVA 205") was placed. In the contents of the flask, a mixture produced by adding 15 parts of the carbon black-graft polymer (1) obtained in Synthesis 1, 3 parts of azo-bis-isobutylonitrile and 3 parts of 2,2'-azo-bis-(2,4-dimethyl valeronitrile) to a polymerizable monomer component prepared in advance with 80 parts of styrene, 20 parts of n-butyl acrylate, and 0.3 part of divinylbenzene was stirred at 8,000 rpm by T.K. homomixer (produced by Tokushukika Kogyo Kabushiki Kaisha) for 5 minutes to afford a homogeneous suspension. The suspension was then heated to 60° C. with nitrogen gas continuously blown therein. The contents of the flask were continuously stirred at this temperature for 5 hours to effect suspension polymerization and then cooled. The suspension was filtered. The residue of the filtration was washed and dried, to afford powdered microfine globular particles (1).

By measurement with a Coulter counter (aperture 100 microns), the colored microfine globular particles were found to possess an average particle diameter of 8.56 microns with a standard deviation of 2.3μm. By observation under an optical microscope, the powder of the colored microfine globular particles (1) was found to be evenly black.

Examples 2 through 6

Colored microfine globular particles (2) through (6) were obtained by repeating the procedure of Example 1, except that the composition of the polymerizable monomer component and the kind of the carbon black-graft polymer were varied as indicated in Table 1. These colored microfine globular particles were tested for attributes in the same manner as in Example 1. The results were as shown in Table 1.

Control 1

The procedure of Example 1 was repeated, except that 5 parts of carbon black, MA-600, was used in the unmodified form in the place of 15 parts of the carbon black-graft polymer (1). In this case, the carbon black showed poor dispersibility in the polymerizable monomer component and the particles were not easily controlled to a uniform particle size. Moreover, during the course of the polymerization reaction, the suspension showed poor stability of dispersion and the greater part of the non-volatile component settled to the bottom of the flask.

Control 2

Microfine particles for comparison (2) were obtained by repeating the procedure of Example 1, except that 15 parts of the grafted carbon black (1) for comparison obtained in Control synthesis 1 was used in the place of 15 parts of the carbon black-graft polymer (1).

The powder of the microfine particles (2) for comparison was tested for attributes in the same manner as in Example 1. The results were as shown in Table 1.

TABLE 1

| | Example | | | | | | Control | |
|---|---|---|---|---|---|---|---|---|
| | 1 | 2 | 3 | 4 | 5 | 6 | 1 | 2 |
| Polymerizable monomer | | | | | | | | |
| component (part) | | | | | | | | |
| Styrene | 80 | 50 | 80 | 80 | 80 | 50 | 80 | 80 |
| Acrylonitrile | | 20 | | | | | | |
| n-Butyl acrylate | 20 | | 20 | 20 | 20 | | 20 | 20 |
| n-Butyl methacrylate | | 30 | | | | | | |
| Divinylbenzene | 0.3 | | | | | 50 | 0.3 | 0.3 |
| Carbon black (part) | | | | | | | | |
| Carbon black- (Kind) | (1) | (2) | (3) | (4) | (5) | (1) | — | — |
| graft polymer (Amount) | 15 | 30 | 15 | 15 | 15 | 15 | | |
| Grafted carbon black (1) for comparison | | | | | | | | 15 |
| Carbon black, MA-600 | | | | | | | 5 | |
| Attributes of particles (Note 1) | | | | | | | | |
| Particle diameter (μm) | 8.56 | 8.00 | 8.30 | 8.00 | 8.50 | 7.00 | Mostly coagulated during suspension polymerization | 15.2 |
| Particle diameter distribution (μm) | 2.3 | 2.9 | 2.1 | 2.05 | 2.4 | 2.1 | | 5.0 |
| Dispersibility of carbon black | Good | Good | Good | Good | Good | Good | | Bad |

Example 7

In the same flask as used in Example 1, 897 parts of deionized water having 3 parts of polyvinyl alcohol (produced by Kuraray Co, Ltd. and marketed under product code of "PVA 205") dissolved therein was placed. In the contents of the flask, a mixture obtained by adding 15 parts of the carbon black-graft polymer (1) obtained in Synthesis 1, 3 parts of azo-bis-isobutylonitrile, 3 parts of 2,2′-azo-bis-(2,4-dimethyl valeronitrile), and 2 parts of an electric charge control agent (produced by Hodogaya Chemical Co., Ltd. and marketed under trademark designation of "Aizen Spiron Black TRH") to a polymerizable monomer component prepared in advance with 80 parts of styrene, 20 parts of n-butyl acrylate, and 0.3 part of divinylbenzene was stirred at 8,000 rpm for 5 minutes by T.K. homomixer (produced by Tokushukika Kogyo Kabushiki Kaisha) to afford a homogeneous suspension. The suspension was heated to 60° C. with nitrogen gas continuously blown therein. It was then continuously stirred at this temperature for 5 hours to effect suspension polymerization and then cooled. The suspension was filtered. The resultant residue of filtration was washed and then dried, to afford a toner (1) for the development of images of static charge.

By measurement with a Coulter counter (aperture 100 microns), the toner (1) for the development of images of static charge was found to possess an average particle diameter of 8.56 microns with a standard deviation of 2.3 microns. By observation under an optical microscope, the powder of the toner (1) for the development of images of static charge was found to be even black. It was found to possess a triboelectric charge of −20 μC/g.

When this toner (1) was used in developing an image of static charge produced by a xerographic machine (produced by Mita Industrial Company, Ltd. and marketed under product code of "DC-113"), the developed image. excelled in repeatability of fine lines and showed absolutely no sign of smearing or fogging and occurred no offset.

Examples 8 through 14

Toners (2) through (8) for the development of images of static charge were obtained by repeating the procedure of Example 7, except that the polymerizable monomer component and the carbon black-graft polymer were varied as indicated in Table 2. These toners were tested for attributes of particles and for the capacity for developing images of static charge produced with the same xerographic machine. The results were as shown in Table 2.

Example 15

A toner (9) for the development of images of static charge was obtained by mixing 100 parts of the colored microfine globular particles (1) obtained in Example 1 with 30 parts of an electric charge control agent (Aizen Spilon Black TRH) prepared in advance in the form of slurry containing 10% of the active component in methanol and then drying the resultant mixture thereby expelling methanol and depositing the electric charge control agent on the surface of the particles (1). When this toner (9) was used in developing images of static charge produced with the same xerographic machine, the results were as shown in Table 2.

Control 3

A toner (1) for comparison was obtained by repeating the procedure of Example 1, except that 15 Parts of the grafted carbon black (1) for comparison (containing 5 parts of carbon black) obtained in Control synthesis 1 was used in the place of 15 parts of the carbon black-graft polymer (1) obtained in Example 7.

The toner (1) for comparison was tested for attributes of particles and for the capacity for developing images of static charge produced with the same xerographic machine. The results were as shown in Table 2.

Control 4

A toner (2) for comparison was obtained by repeating the procedure of Control 3, except that divinylbenzene was not blended in the polymerizable monomer components.

The toner (2) for comparison was tested for attributes of particles and for the capacity for developing images of static charge produced with the same xerographic machine. The results were as shown in Table 2.

diameters exceeding 5 μm was counted and rated by the following scale.

Super grade: The number coagulated particles was less than 10/50 cm².

TABLE 2

|  | Example |  |  |  |  |  |  |  |  | Control |  |
|---|---|---|---|---|---|---|---|---|---|---|---|
|  | 7 | 8 | 9 | 10 | 11 | 12 | 13 | 14 | 15 | 3 | 4 |
| Polymerizable monomer component (part) |  |  |  |  |  |  |  |  |  |  |  |
| Styrene | 80 | 50 | 75 | 70 | 62 | 80 | 80 | 80 | 80 | 80 | 80 |
| Acrylonitrile |  | 20 |  |  |  |  |  |  |  |  |  |
| n-Butyl acrylate | 20 |  | 15 | 20 |  | 17 | 10 | 20 | 20 | 20 | 20 |
| n-Butyl methacrylate |  | 20 |  |  | 30 |  |  |  |  |  |  |
| Divinylbenzene | 0.3 |  |  |  |  |  |  |  | 0.3 | 0.3 |  |
| Methacrylic acid |  | 5 | 5 | 10 | 5 |  |  |  |  |  |  |
| Glycidyl methacrylate |  | 5 |  |  |  |  |  |  |  |  |  |
| Denacol EX-211 |  |  | 5 |  |  |  |  |  |  |  |  |
| 2-p-Phenylene-bis-2-oxazoline |  |  |  |  | 3 |  |  |  |  |  |  |
| Zn(OH)₂ |  |  |  |  |  | 3 |  |  |  |  |  |
| Hyperion |  |  |  |  |  |  | 10 |  |  |  |  |
| Carbon black (part) |  |  |  |  |  |  |  |  |  |  |  |
| Carbon black- (Kind) | (1) | (2) | (3) | (2) | (4) | (4) | (5) | (1) | (1) |  |  |
| graft polymer (Amount) | 15 | 30 | 20 | 30 | 15 | 20 | 15 | 15 | 20 |  |  |
| Grafted carbon black (1) for comparison |  |  |  |  |  |  |  |  |  | 15 | 15 |
| Method of use of electric charge control agent (Note 2) | A | A | A | A | A | A | A | A | B | A | A |
| Attributes particles (Note 3) |  |  |  |  |  |  |  |  |  |  |  |
| Particle diameter (μm) | 8.56 | 8.00 | 8.30 | 7.50 | 7.10 | 7.60 | 8.50 | 7.90 | 8.30 | 15.2 | 15.5 |
| Particle diameter distribution (μm) | 2.3 | 2.9 | 2.1 | 2.0 | 2.4 | 2.1 | 2.5 | 2.5 | 2.1 | 5.0 | 4.8 |
| Dispersibility of carbon black | good | good | good | good | good | good | good | good | good | bad | bad |
| Amount of triboelectric charge (μC/g) | −20 | −22 | −19 | −25 | −20 | −21 | −23 | −20 | −23 | −15.2 | −15.0 |
| Image condition (Note 4) |  |  |  |  |  |  |  |  |  |  |  |
| Smearing | no | no | no | no | no | no | no | no | no | yes | yes |
| Fogging | no | no | no | no | no | no | no | no | no | yes | yes |
| Repeatability of fine lines | good | good | good | good | good | good | good | good | good | bad | bad |
| Offset | O | O | O | O | O | O or Δ | O or Δ | Δ | O | Δ | X |

Example 16

A polyester composition was obtained by mixing 100 parts of polyethylene terephthalate chips with such amount of the colored microfine globular particles (6) obtained in Example 6, that the carbon black content of the composition would be 2 parts.

The polyester composition thus produced was melt extruded with an extruding machine at 290° C. to produce a sheet. Then, the sheet of the polyester composition was biaxially stretched at 90° C., with the longitudinal stretching ratio at 3.5 times and the lateral stretching ratio at 4.0 times respectively the original size and then thermally set at 200° C., to afford a film 15 microns in thickness. This film was tested for particle coarseness and surface coarseness by the method to be described afterward. The results were as shown in Table 3.

Control 5

A film for comparison was obtained by following the procedure of Example 16, except that 1 part of untreated carbon black, (#45, produced by Mitsubishi Chemical Industries, Ltd.), was intactly used in the place of the colored microfine globular particles (6) in Example 6. The film for comparison was similarly tested for particle coarseness and surface coarseness. The results were as shown in Table 3.

(Method for Evaluation of Film)

(1) Particle coarseness

A sample film was observed with a microscope under a polarized transmitting light to find the presence or absence of foreign matter in the film. The number of coagulated carbon black particles having maximum diameters exceeding 5 μm was counted and rated by the following scale.

First grade: The number of coagulated particles was 10 to 20/50 cm².

Second grade: The number of coagulated particles was 20 to 50/50 cm².

Third grade: The number of coagulated particles was not less than 50/50 cm².

The film rated as super grade or first grade is acceptable for practical use.

(2) Surface coarseness

This property was determined by measurement with a surface roughness tester produced by Sloan Corp., using a touch needle 12.5 μm in diameter under contact pressure of 50 mg.

TABLE 3

|  | Coarse particle | Surface coarseness (micron) |
|---|---|---|
| Example 16 | Super grade | 0.011 |
| Control 5 | Third grade | 0.050 |

The data of the table indicate that the film obtained in Example 16, contained only a small number of coarse particles and had smooth surface and deserved to be esteemed highly. In contrast, the film obtained in Control 5, probably because the carbon black underwent no surface treatment, contained a number of coarse particles, sustained rupture during the conversion of the polyester composition into film, and exhibited poor workability.

Example 17

Under a current of nitrogen gas, 50 parts of isophthalic acid, 70 parts of maleic anhydride, 34 parts of ethylene glycol, and 38 parts of propylene glycol were subjected to an esterifying reaction at 200° C. for 22 hours, to afford an unsaturated polyester possessing an acid number of 23. An unsaturated polyester resin (hereinafter referred to as "unsaturated polyester resin (1)") was obtained by combining 40.6 parts of the unsaturated polyester with 50.4 parts of styrene.

Then, a thermosetting resin composition (hereinafter referred to as "resin composition (1)") was obtained by mixing 100 parts of the unsaturated polyester resin (1) with 18 parts of the colored microfine globular particles (2) obtained in Example 2.

The resin composition (1) consequently obtained was mixed with 1.3 parts of t-butyl peroxybenzoate, 4 parts of zinc stearate, and 100 parts of calcium carbonate. Further, 70.7 parts of glass fibers 25 mm in length and 13 microns in diameter were impregnated with an immersing liquid obtained in advance by mixing 1.0 part of magnesium oxide with the aforementioned paste. The wet glass fibers were nipped in the form of sheet between two opposed polyethylene blocks and then aged at 40° C. for 40 hours, to afford a sheet molding compound (SMC). This SMC was press molded in a mold 300 mm×100 mm at 145° C. under 50 kg/cm$^2$ for 4 minutes, to afford a planar shaped article 2 mm in thickness. By visual observation with unaided eyes, this shaped article showed absolutely no sign of uneven coloration or transfer of dirt from the mold. The shrinkage of this SMC by the molding, as determined by the method of JIS K-6911, was found to be 0.09%. The gloss of the surface of the shaped article determined in terms of reflectance (%) by measurement using a surface gloss meter at an angle of 60° was found to be 85.3%, indicating that this shaped article was excellent in surface smoothness.

Example 18 and Control 6

A vinyl chloride-vinyl acetate copolymer (produced by the Japanese Zeon Co., Ltd. and marketed under product code of "400X-110A) as a binder, polyurethane (produced by Nippon Polyurethane Co., Ltd. and marketed under trademark designation of "Nippolane 2301), and polyisocyanate (produced by Nippon Polyurethane Co., Ltd. and marketed under trademark designation of "Coronate L") were dissolved in the amounts indicated in Table 4 in MEK. Then, in the resultant solution, the colored microfine globular particles (1) obtained in Example 1, and carbon black (produced by Asahi Co., Ltd. and marketed under product code of Asahi #60") were respectively added in the amounts indicated in Table 4 and thoroughly stirred to give rise to a carbon black-containing coating composition (1) and a carbon black-containing coating composition (1) for comparison.

The carbon black-containing coating compositions were severally applied on a polyethylene terephthalate film in an amount calculated to form a dry film 10 microns in thickness. The applied layer of the coating composition was dried at room temperature to give rise to a coated article to be tested for film quality. The results of the test were as shown in Table 4.

TABLE 4

|  | Example 18 | Control 6 |
| --- | --- | --- |
| Carbon black-containing coating composition | (1) | (1) for comparison |
| Composition of Carbon black-containing coating composition (part) |  |  |
| Colored microfine globular particle (1) | 60 |  |
| Carbon Black (Asahi #60) |  | 30 |
| 400X-110A | 17 | 30 |
| Nippolan 2301 | 9 | 15 |
| Coronate L | 14 | 25 |
| Methylethyl ketone | 300 | 300 |
| Quality of coat |  |  |
| Antistatic property | $1.5 \times 10^4$ | $8.5 \times 10^4$ |
| Frictional coefficient | 0.25 | 0.34 |
| Wear Resistance | O | X |
| Stability of solution to withstand storage | O | X |

It is clearly noted from Table 4 that the carbon black-containing coating composition of the present invention exhibited highly desirable dispersibility and excelled in antistatic property, slipping property, and wear resistance.

The properties indicated in Table 4 were determined by tests of the following methods.

Antistatic property: This property was determined by allowing a sample coat to stand for 24 hours in an atmosphere kept at 25° C. under 60% RH and, at the end of the standing, measuring the electric resistance of the surface of the coat.

Frictional coefficient: This property was determined by measuring the coefficient of kinetic friction (3.3 cm/sec.hr)$\mu$ of a stainless steel ball with a surface property tester using a sample coat.

Wear resistance: This property was determined by exposing a sample coat to the impact of 100 reciprocating travels of the stylus of a Gakushin type dye fastness tested on the surface of the coat in accordance with the method, 45R, defined by JIS L-1084 and then visually evaluating the condition of the wear inflicted on the coat by the impact on the two-point scale, wherein the circle (O) stands for absence of sign of wear and the cross (x) for presence of sign of wear.

Stability of solution to withstand storage: This property was determined by allowing a given carbon black-containing coating composition to stand for 6 months in a room kept at 25° C. and, at the end of the standing, visually examining the solution to find the extent to which the condition of the solution changed in consequence of the standing, using the to-point scale, wherein the circle (O) stands for absence of change and the cross (x) for occurrence of sediment of carbon black.

Example 19

A thermosensitive transfer ink was prepared by stirring 50 parts of colored microfine globular particles (6) of an average particle diameter of 7 microns obtained in Example 6, with 50 parts of carnauba wax at 100° C. for 30 minutes. When the ink was spread in a thin layer on a glass plate and observed under a microscope as to the condition of dispersion of the colored microfine globular particles, it showed highly desirable dispersibility. On a biaxially stretched PET film having a thickness of 10 microns, this ink was applied in an amount calculated to form, on drying, an ink layer 10 microns in thickness. The application of the ink was carried out with a wire bar after the ink had been heated to a temperature proper for the ink to assume a fluid state. The thermosensitive transfer sheet consequently obtained was set in place on a thermal printer and pressed on a sheet of ordinary paper to impart a print thereon. When the image produced on the paper was tested for quality in terms of resolution and faithfulness of image transfer, the results were highly satisfactory. The image was also tested for scratch strength by a procedure of rubbing the image surface with a stainless steel bar possessing a hemispherical terminal 1.5 mm in radius under a load of 100 g. In the test, the image retained the fastness of adhesion intact without sustaining any scratch.

Example 20

An ink ribbon coating agent was prepared by mixing 20 parts of the colored microfine globular particles (6) obtained in Example 6, with 100 parts of polyurethane (a polyester type polyurethane possessing a molecular weight of about 30,000, obtained from adipic acid, 1,6-hexane diol, and MDI) as a binder component, and 70 parts of a solvent (an equivoluminal mixture of tetrahydrofuran and methylethyl ketone). This ink ribbon coating agent was applied to the rear side of a thermosensitive transfer tape and the thermosensitive transfer tape was set in place on a thermal printer and put to use so as to test the ink ribbon coating agent for quality. The thickness of the applied coat was about 10 microns. The results of the test indicate that the applied coat excelled in both slipping property and antistatic property.

Example 21

A back-coating agent was prepared by mixing 20 parts of the colored microfine globular particles possessing an average particle diameter of 8.56 microns obtained in Example 1 with 100 parts of the same polyurethane as used in Example 25 as a binder and 70 parts of a solvent (a 3/3/1 mixture of toluene, methylethyl ketone, and cyclohexane). The back-coating agent was applied to the rear side of a video tape and tested for quality by the methods shown below. The back-coat layer showed wear resistance of the best mark (◉).

1. Preparation of test piece (a) Dispersion of colored microfine globular particles: In a vessel, the colored microfine globular particles, the binder, and the solvent in respectively prescribed amounts were placed and stirred at room temperature for 15 minutes with a propeller blade stirrer.

(b) Thickness of the back-coat layer: About 10 microns in dry layer thickness.

2. Test for quality

Wear resistance of back-coat layer: The video tape having the back-coat layer deposited on the rear side thereof was run for a fixed period, with a white cotton cloth kept pressed against the back-coat layer with a force of 350 g/cm$^2$. At the end of this running, the white cloth was tested for the extent to which it was defiled with the back-coating agent on the four-point scale, wherein the double circle (◉) stands for complete absence of defilment (no separation of carbon black), the circle (◯) for slight occurrence of defilment, the triangle (△) for fair occurrence of defilment, and the cross (x) for conspicuous occurrence of defilment (heavy separation of carbon black).

Industrial Applicability:

Since the colored microfine globular particles of the present invention according with this invention are obtained, as described above, by causing carbon to react with a polymer capable of reacting with the carbon black thereby producing a carbon black-graft polymer, dispersing the carbon black-graft polymer in a polymerizable monomer component, and then polymerizing the polymerizable monomer component, they have carbon black thoroughly and uniformly dispersed therein and, in the unmodified form thereof, can be used as a toner for the development of images of static charge or, in a form having a varying resin or binder incorporated therein, can be used such as in resin composition, coating composition, thermosensitive transfer ink ribbon coating agent, thermosensitive transfer ink, or back-coating agent in magnetic recording medium.

What is claimed is:

1. Colored microfine globular particles, obtained by a process comprising causing carbon black to react with a polymer capable of reacting with said carbon black thereby forming a carbon black-graft polymer, dispersing said carbon black-graft polymer in a polymerizable monomer component, and then polymerizing said polymerizable monomer component.

2. Colored microfine globular particles according to claim 1, wherein said carbon black possesses a pH value of not more than 8.

3. Colored microfine globular particles according to claim 1, wherein said carbon black possesses a pH value of not more than 6.

4. Colored microfine globular particles according to claim 1, wherein the polymerization of said monomer component is carried out in the form of suspension polymerization.

5. Colored microfine globular particles according to claim 1, wherein said polymer capable of reacting with said carbon black possesses a number average molecular weight in the range of 500 to 1,000,000.

6. Colored microfine globular particles according to claim 5, wherein said polymer capable of reacting with said carbon black is a polymer possessing in the molecular unit thereof at least one reactive group selected from the class consisting of aziridine group, oxazoline group, N-hydroxy alkylamide group, epoxy group, thioepoxy group, and isocyanate group.

7. Colored microfine globular particles according to claim 5, wherein said polymer capable of reacting with said carbon black is a polymer possessing in the molecular unit thereof at least one reactive group selected from the class consisting of aziridine group, oxazoline group, and epoxy group.

8. Colored microfine globular particles according to claim 5, wherein said polymer capable of reacting with said carbon black is a polymer possessing in the molecular unit thereof at least one reactive group selected from the class consisting of aziridine group and oxazoline group.

9. Colored microfine globular particles according to claim 1, wherein said polymer capable of reacting with said carbon black is a polymer selected from the group consisting of vinyl polymers, polyesters, and polyethers which possess at least one reactive group in the molecular unit thereof.

10. Colored microfine globular particles according to claim 1, wherein said carbon black-graft polymer has been produced by the reaction of 100 parts by weight of carbon black with 1 to 3,000 parts by weight of said polymer capable of reacting with said carbon black.

11. Colored microfine globular particles according to claim 1, wherein said carbon black-graft polymer has been produced by the reaction of 100 parts by weight of carbon black with 5 to 1,000 parts by weight of said polymer capable of reacting with said carbon black.

12. Colored microfine globular particles according to claim 1, wherein said polymerizable monomer component contains not less than 0.005% by weight of a cross-linkable compound.

13. Colored microfine globular particles according to claim 1, wherein said polymerizable monomer component contains 0.01 to 80% by weight of a cross-linkable compound.

14. Colored microfine globular particles according to claim 1, wherein said particles possess diameters in the range of 1 to 100 microns.

15. Colored microfine globular particles according to claim 1, wherein the amount of said carbon black-graft polymer is in the range of 3 to 60% by weight, based on the amount of said polymerizable monomer component.

16. A method for the production of colored microfine globular particles, characterized by causing carbon black to react with a polymer capable of reacting with said carbon black at a temperature in the range of 20° to 350° C., dispersing the resultant carbon black-graft polymer in a polymerizable monomer component and then polymerizing said polymerizable monomer component.

17. A method according to claim 16, wherein said polymerization of the monomer component is carried out in the form of suspension polymerization.

18. A method according to claim 17, wherein water is used in an amount in the range of 200 to 1,900 parts by weight, based on 100 parts by weight of said polymerizable monomer component.

19. A method according to claim 16, wherein the pH value of said carbon black is not more than 8.

20. A method according to claim 16, wherein the pH value of said carbon black is not more than 6.

21. A method according to claim 16, wherein said polymer capable of reacting with said carbon black possesses a number average molecular weight in the range of 500 to 1,000,000.

22. A method according to claim 21, wherein said polymer capable of reacting with said carbon black is a polymer possessing in the molecular unit thereof at least one reactive group selected from the class consisting of aziridine group, oxazoline group, N-hydroxy alkylamide group, epoxy group, thioepoxy group, and isocyanate group.

23. A method according to claim 21, wherein said polymer capable of reacting with said carbon black is a polymer possessing in the molecular unit thereof at least one reactive group selected from the class consisting of aziridine group, oxazoline group and epoxy group.

24. A method according to claim 21, wherein said polymer capable of reacting with said carbon black is a polymer possessing in the molecular unit thereof at least one reactive group selected from the class consisting of aziridine group and oxazoline group.

25. A method according to claim 16, wherein said polymer capable of reacting with said carbon black is a polymer selected from the group consisting of vinyl polymers, polyesters, and polyethers which possess at least one reactive group in the molecular unit thereof.

26. A method according to claim 16, wherein said carbon black-graft polymer has been produced by the reaction of 100 parts by weight of carbon black with 1 to 3,000 parts by weight of said polymer capable of reacting with said carbon black.

27. A method according to claim 16, wherein said carbon black-graft polymer has been produced by the reaction of 100 parts by weight of carbon black with 5 to 1,000 parts by weight of said polymer capable of reacting with said carbon black.

28. A method according to claim 16, wherein said polymerizable monomer component contains not less than 0.005% by weight of a cross-linkable compound.

29. A method according to claim 16, wherein said polymerizable monomer component contains 0.01 to 80% by weight of a cross-linkable compound.

30. A method according to claim 16, wherein said particles possess diameters in the range of 1 to 100 microns.

31. A method according to claim 16, wherein the amount of said carbon black-graft polymer is in the range of 3 to 60% by weight, based on the amount of said polymerizable monomer component.

32. A toner for the development of an image of electrostatic charge, comprising said colored microfine globular particles of claim 1.

33. A toner according to claim 32, wherein said carbon black possesses a pH value of not more than 8.

34. A toner according to claim 32, wherein said carbon black possesses a pH value of not more than 6.

35. A toner according to claim 32, wherein the polymerization of said monomer component is carried out in the form of suspension polymerization.

36. A toner according to claim 32, wherein said polymer capable of reacting with said carbon black possesses a number average molecular weight in the range of 500 to 1,000,000.

37. A toner according to claim 36, wherein said polymer capable of reacting with said carbon black is a polymer possessing in the molecular unit thereof at least one reactive group selected from the class consisting of aziridine group, oxazoline group, N-hydroxy alkylamide group, epoxy group, thioepoxy group, and isocyanate group.

38. A toner according to claim 36, wherein said polymer capable of reacting with said carbon black is a polymer possessing in the molecular unit thereof at least one reactive group selected from the class consisting of aziridine group, oxazoline group, and epoxy group.

39. A toner according to claim 36, wherein said polymer capable of reacting with said carbon black is a polymer possessing in the molecular unit thereof at least one reactive group selected from the class consisting of aziridine group and oxazoline group.

40. A toner according to claim 32, wherein said polymer capable of reacting with said carbon black is a polymer selected from the group consisting of vinyl polymers, polyesters, and polyethers which possess at least one reactive group in the molecular unit thereof.

41. A toner according to claim 32, wherein said carbon black-graft polymer has been produced by the reaction of 100 parts by weight of carbon black with 1 to 3,000 parts by weight of said polymer capable of reacting with said carbon black.

42. A toner according to claim 32, wherein said carbon black-graft polymer has been produced by the reaction of 100 parts by weight of carbon black with 5 to 1,000 parts by weight of said polymer capable of reacting with said carbon black.

43. A toner according to claim 32, wherein said polymerizable monomer component contains 0.005 to 20% by weight of a cross-linkable compound.

44. A toner according to claim 32, wherein said particles possess diameters in the range of 1 to 100 microns.

45. A toner according to claim 32, wherein the amount of said carbon black-graft polymer is in the range of 3 to 60% by weight, based on the amount of said polymerizable monomer component.

* * * * *